(12) United States Patent
Nagata

(10) Patent No.: US 6,579,117 B2
(45) Date of Patent: *Jun. 17, 2003

(54) CONNECTOR

(75) Inventor: Takayuki Nagata, Higashiosaka (JP)

(73) Assignee: Hosiden Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,777

(22) Filed: Sep. 13, 1999

(65) Prior Publication Data

US 2001/0055912 A1 Dec. 27, 2001

(30) Foreign Application Priority Data

Sep. 14, 1998 (JP) ............................................ 10-259828
Sep. 25, 1998 (JP) ............................................ 10-270635

(51) Int. Cl.$^7$ ........................ H01R 13/58; H01R 11/20; H01R 4/24; H01R 4/26
(52) U.S. Cl. ........................ 439/456; 439/457; 439/459; 439/404
(58) Field of Search ................................ 439/456, 457, 439/459, 404, 405, 460, 692, 697, 682

(56) References Cited

U.S. PATENT DOCUMENTS

| | | | | |
|---|---|---|---|---|
| 3,751,579 A | * | 8/1973 | Nojiri | 174/153 G |
| 4,227,763 A | * | 10/1980 | Marks | 439/404 |
| 4,424,403 A | * | 1/1984 | Bogese, II | 174/36 |
| 4,909,755 A | * | 3/1990 | Chen | 439/418 |
| 5,425,657 A | * | 6/1995 | Davis et al. | 439/610 |
| 5,520,550 A | * | 5/1996 | Okabe | 439/404 |
| 5,681,176 A | | 10/1997 | Ibaraki et al. | 439/165 |
| 5,683,272 A | * | 11/1997 | Abe | 439/747 |
| 5,951,331 A | * | 9/1999 | Li-Ming et al. | 439/682 |

FOREIGN PATENT DOCUMENTS

| | | |
|---|---|---|
| DE | 19756585 A | 6/1998 |
| EP | 0365888 A | 5/1990 |

* cited by examiner

*Primary Examiner*—P. Austin Bradley
*Assistant Examiner*—Edwin A. León
(74) *Attorney, Agent, or Firm*—Webb Ziesenhiem Logsdon Orkin & Hanson, P.C.

(57) ABSTRACT

(1) A connector includes a body, at least one contact metal element inserted and fitted along a direction in the body and a lead wire having one end portion thereof inserted into an opening of the body along a further direction different from the inserting direction of the contact metal element. The one end portion of the lead wire inserted in the body is laterally pressed and contacted by a leading end of the contact metal element to be electrically connected therewith, and the other portion of the lead wire not inserted in the body is bent at the opening to the inserting direction of the contact metal element, with the bent portion of the lead wire being retained by a lead wire retaining portion of the body.

(2) A connector includes a body and a plurality of contact metal elements inserted and fitted in the body. One-side ends of the contact metal elements project respectively from a front face of the body in a first direction facing the front face and the other-side ends of the contact elements extend parallel with each other relative to the first direction and along an outer peripheral side face of the body in a second direction normal to the first direction. A gap of a predetermined distance is formed between all the other-side ends of the contact elements and the outer peripheral side face.

11 Claims, 7 Drawing Sheets

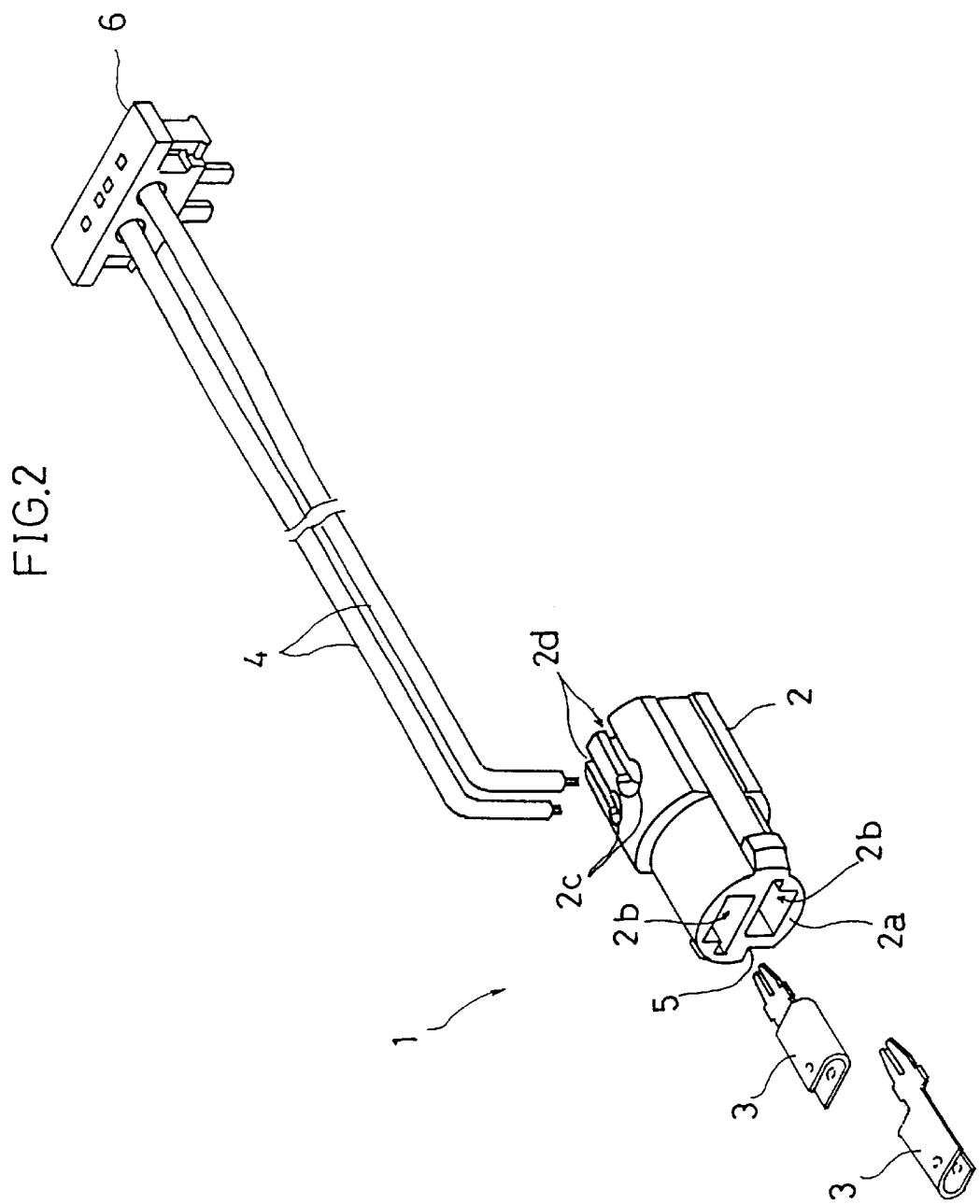

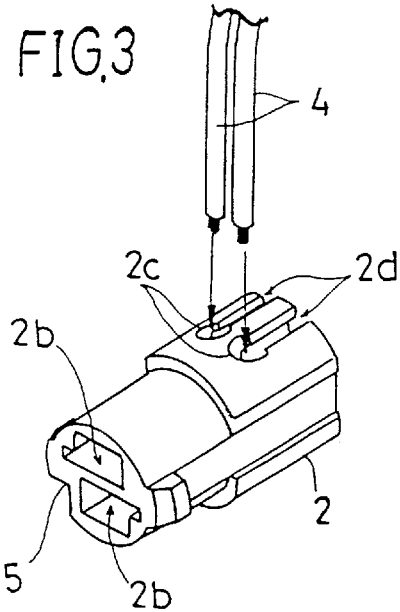
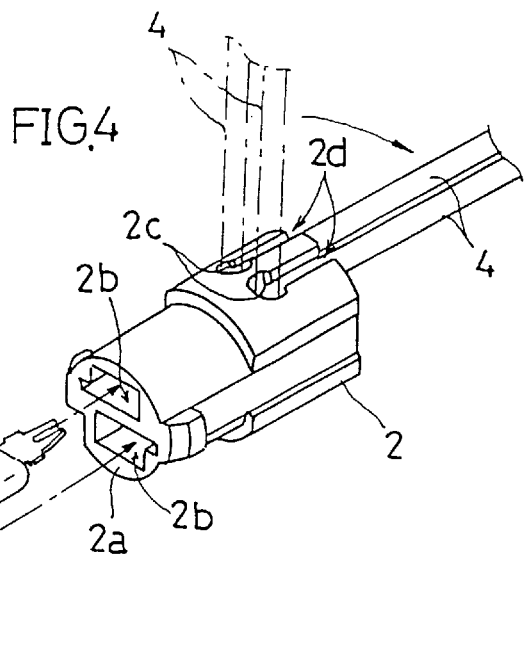
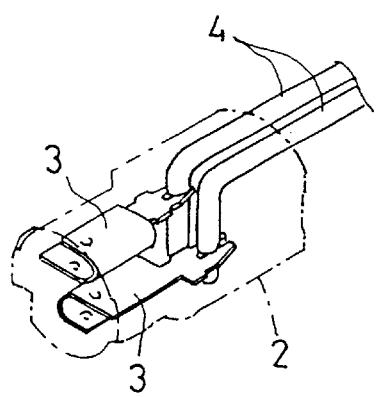
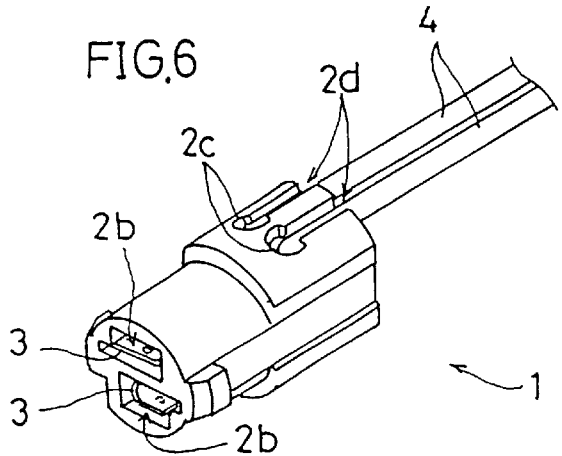

CONNECTOR

BACKGROUND OF THE INVENTION

1. Field of the Invention

The present invention relates to a connector including a body having a contact metal element fitted to the body and a lead wire electrically connected with the metal element. The invention relates also to a connector including a body having a plurality of contact metal elements fitted to the body. More particularly, the invention relates to a connector suitable for use in a compact apparatus such as a portable telephone having a body and a lid pivotably attached to the body via a hinge shaft, the connector being used for connecting an electric circuit mounted on the body with another electric circuit mounted on the lid.

2. Description of the Related Art

Conventionally, in a compact apparatus such as a portable telephone shown in FIG. 15 including a body 41 and a lid 42 attached to the body to be pivotable relative thereto about a hinge shaft 43, for forming electric connection between a circuit board mounted on the body and another circuit board mounted on the lid, a lead wire 44 would be inserted through the hinge unit. However, this lead wire inserting operation would impede the automated assembly process, resulting in overall reduction of operational efficiency.

In view of the above, the prior art proposed use of a connector having a body which incorporates therein a contact metal element and also a lead wire electrically connected with the metal element, in an attempt to facilitate the assembly of the connector within the compact apparatus. However, if the electrical connection between the contact metal element and the lead wire is provided by means of crimping or soldering, the operational efficiency is low, leading to poor production efficiency. Further, since it is difficult to form compact the above connector incorporating a lead wire, the connector is unsuited for use in a compact apparatus such as a portable telephone. For these reasons, pressure welding is preferred for forming the above-mentioned electrical connection. With pressure welding, however, in general, the direction of insertion of the contact element is normal to the longitudinal direction of the lead wire. As a result, in association with pivotal movement of the hinge portion, the connector body housed within this hinge portion is rotated also about the rotational axis, this results in significant amount of rotational movement of the elongate portion of the lead wire. Then, if the leading end of the lead wire is fixedly attached to another circuit board by means of e.g. soldering, the lead wire will be subjected to excessive distortion or tension. Consequently, the lead wire may be broken or may provide undesirable resistance or hindrance to the pivotal movement of the hinge portion.

Further, in case a connector including a body having a plurality of contact metal elements fitted thereto is employed in the hinge portion in an attempt to avoid the trouble of inserting operation of the lead wire, if the electrical connection between the contact elements and the lead wires for connection to the circuit board is to be provided by means of surface mounting or insertion mounting, the efficiency of the fixing operation thereof by soldering or the like is also low, thus inviting reduction in the overall production efficiency. Further, the greater the number of the contact elements, the greater the degree of resultant deterioration in the operational efficiency, since each and every element requires such fixing operation. Accordingly, if such connector is to be used within the hinge portion, consideration needs to be given to provide easy and reliable electrical connection between the contact metal elements and the circuit board so as to facilitate the mounting operation of the connector in a compact apparatus and assembly operation of the same.

SUMMARY OF THE INVENTION

The present invention has been made in order to solve the above-described drawbacks of the prior art. According a first characterizing feature of the present invention, there is provided a connector including a body, at least one contact metal element inserted and fitted along a direction in the body, and a lead wire having one end portion thereof inserted into an opening of the body along a further direction different from the inserting direction of the contact element, wherein the one end portion of the lead wire inserted in the body is laterally pressed and contacted by a leading end of the contact metal element to be electrically connected therewith, and the other portion of the lead wire not inserted in the body is bent at said opening to said inserting direction of the contact element, with said bent portion of the lead wire being retained by a lead wire retaining portion of the body.

With the above feature, the electrical connection between the contact element and the lead wire is established as the leading end of the contact element, when inserted into the body, comes into pressure contact laterally with the lead wire portion which is also inserted in the body. Accordingly, the assembly operation is easy. In addition, the remaining elongate portion of the lead wire which is not inserted in the body is adapted to extend parallel with the inserting direction of the contact element. With this, when the connector is fitted within a hinge portion of a compact apparatus such as a portable telephone in such a manner that the connector is pivotable therein about the rotational axis along the inserting direction of the contact element in association with a pivotal movement of the hinge portion, this results only in slight twisting movement of the non-inserted portion of the lead wire about the rotational axis, rather than significant amount of rotational displacement thereof. As a result, the above-described trouble of excessive bending or tension of the lead wire leading eventually to breakage thereof may be avoided. Hence, there has been provided a connector with high reliability.

Preferably, in the connector described above, the body includes, in a front face thereof, an engaging portion for engagement with an engaged portion of a further connector to be connected with said connector, the engagement establishing rotational asymmetry between said connector and said further connector relative to a rotational axis extending along a direction in which the two connectors face each other.

When a plurality of contact elements are disposed in rotational symmetric relation, for instance, when two contact elements are disposed at rotationally symmetric positions 180 degree phase apart from each other, the above construction having such engaged portion may preclude the possibility of erroneous engagement between the two connectors, by assisting in proper connection between each element of the connector with a corresponding element of the other connector.

According to a second feature of the present invention, there is provided a connector comprising a body, and a plurality of contact metal elements inserted and fitted in the body, wherein one-side ends of the contact element project respectively from a front face of the body in a first direction facing the front face and the other-side ends of said contact elements extend parallel with each other relative to said first direction and along an outer peripheral side face of the body in a second direction normal to said first direction, with forming a gap of a predetermined distance between all said other-side ends of the contact elements and said outer peripheral side face.

With the above feature, an FPC (flexible punted circuit) having a thickness adapted for said gap may be press-fitted into the gap from the second direction along the extending direction of the other-side ends of the contact elements, so that the respective other-side ends and the FPC to be electrically connected with the circuit board may be reliably fixed to each other without mutual displacement therebetween. Accordingly, the connecting operation between each other-side end and a corresponding terminal of the FPC may be facilitated significantly. Also, production of defect product due to defective soldering, short-circuit between the terminals or the like may be avoided advantageously.

Further, as the projecting direction (the first direction) of one-side end of the contact element is normal to the press-fitting direction (the second direction) of the FPC, when this connector is disposed within the hinge portion with aligning the hinge axis with the first direction, the FPC may be press-fitted into the gap in the direction normal to the hinge axis, i.e. the direction where the circuit board exists. Hence, this press-fitting operation may be effected with ease.

Preferably, in the connector described above, the other-side end of each said contact element forms, on an inner face thereof, a projection projecting toward said outer peripheral side face.

With formation of such projection, when the FPC is press-fitted into the gap, the terminal on the FPC and the projection may be contacted in a stable and reliable manner, thereby to assure sufficient electrical connection therebetween without soldering. Moreover, one time press-fitting operation may establish a plurality of electrical connections. As a result, the overall operational efficiency may be further improved.

In the connector having the above construction, preferably, one of the contact elements whose other-side end is located farthest from the front face of the body includes a bent portion formed by bending all or a portion of side portion of the other-side end remote from the front face of the body toward the outer peripheral side face.

The above-described bent portion serves to restrict displacement of the press-fitted FPC in the opposite direction to the first direction. The fixation and positioning between each other-side end and the terminal on the FPC may be rendered more reliable, consequently providing greater reliability in the electrical connection therebetween and still further improvement in the operational efficiency and the product quality.

Preferably, in the connector having the above construction, the body includes, in a front face thereof, an engaging portion for engagement with an engaged portion of a further connector to be connected with said connector, the engagement establishing asymmetry between said connector and said further connector relative to a rotational axis extending along a plane facing said further connector.

With the above feature, the mechanical connection between the connector and the other connector is provided not only by the contact elements of the two connectors but also by their bodies through the engagement between the engaging portion and the engaged portion thereof. As a result, when an external force such a twisting force is applied between the connectors, such external force may be effectively absorbed by the connector bodies, so as to prevent deformation of the contact elements, especially deformation of one-side end of each element projecting from the front face of the body. Hence, problem of malconnection due to deformation may be avoided advantageously.

Moreover, when a plurality of contact elements are disposed in rotational symmetric arrangement on the front face of the body, for instance, two contact elements are disposed at rotational symmetric positions 180 degrees apart from each other, the above asymmetric arrangement may preclude the possibility of erroneous engagement between the two connectors, by assisting in proper connection between each element of the connector with a corresponding element of the other connector.

Further and other objects, features, and advantages of the present invention will become apparent from the following detailed description of he preferred embodiments thereof in conjunction with the accompanying drawings.

BRIEF DESCRIPTION OF THE DRAWINGS

FIG. 2 is an exploded perspective view of a connector having the first characterizing feature of the present invention, FIG. 3 is a perspective view illustrating a step of inserting a lead wire in the assembly process of the connector, FIG. 4 is a perspective view illustrating further steps in the assembly process of the connector for fixing the lead wire and inserting a contact metal element, FIG. 5 is a perspective view showing contact condition between the lead wire and the contact element inside a body of the connector, FIG. 6 is a perspective view illustrating assembly-completed condition of the connector having the first characterizing feature of the present invention.

DETAILED DESCRIPTION OF THE PREFERRED EMBODIMENTS

Next, preferred embodiments of the present invention will be described in details with reference to the accompanying drawings.

Figure 1:
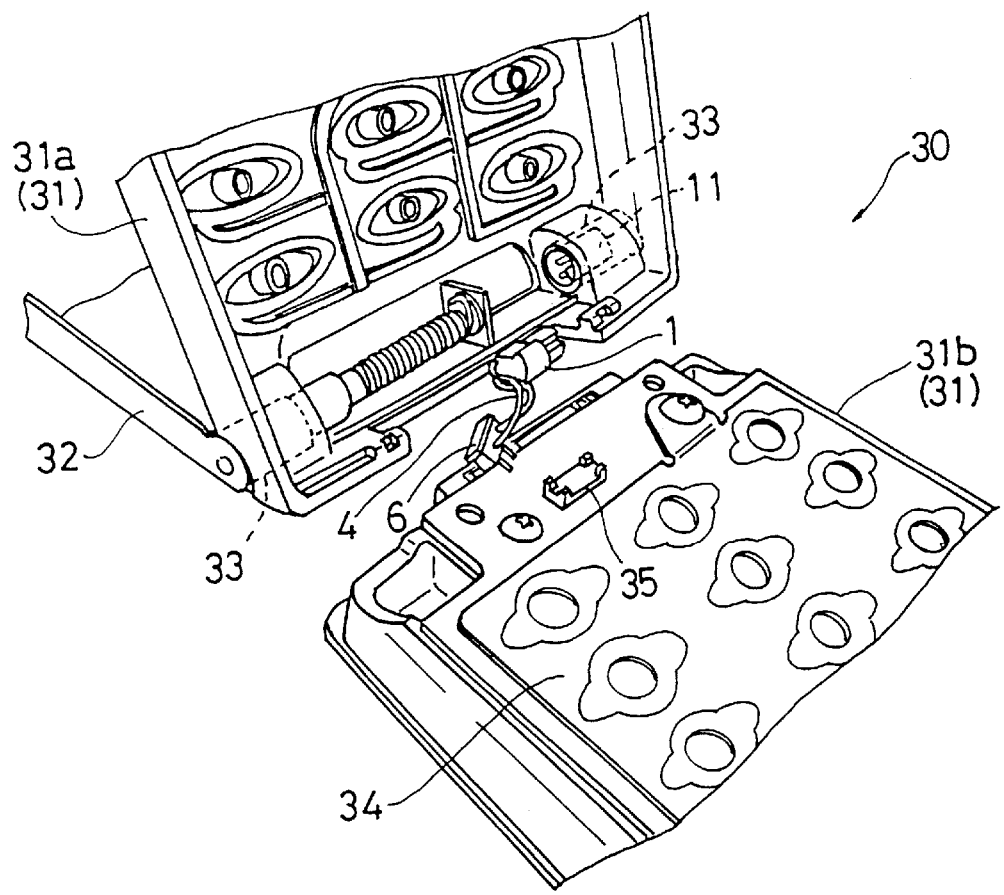
FIG. 1 is a perspective view showing principal portions of a compact apparatus using a connector relating to the present invention.

Connectors 1, 11 according to the present invention include a female connector 1 having the first characterizing feature and a male connector 11 having the second characterizing feature and connectable with the female connector 1. As shown in FIG. 1, these connectors 1, 11 are incorporated in a hinge portion of a compact apparatus 30 such as a portable telephone having a body 31 and a lid 32 pivotable relative to the body about a hinge shaft 33. In FIG. 1, the body 31 is shown in a condition exploded into a cover portion 31*a* located on the side of the lid 32 and a circuit board side body 31*b* accommodating a printed circuit board 34 therein.

First, the embodiments of the female connector 1 will be described.

As described hereinbefore, this connector 1 is to be mounted within the hinge portion of the compact apparatus 30. For this reason, as shown in FIGS. 2 through 6, the connector 1 includes a substantially cylindrical body 2 made of insulating material and sized to be fitted into a cylindrical inner hollow portion of the hinge portion. This body 2 includes two contact element inserting slots 2*b* into which two contact metal elements 3 are to be respectively inserted and fitted. The slots 2*b* are defined in a front face 2*a* of the body 2 facing the other mating male connector 11 and extend into the body 2 along the longitudinal direction thereof. Further, at the rear portion of the body 2, there are defined two lead wire inserting slots 2*c* into which respective leading ends of two lead wires 4 adapted to be electrically connected with the two contact elements 3 are introduced respectively along the vertical direction in the figure normal to the longitudinal direction, with the remaining elongate portions of the lead wires 4 remaining and extending outside the body 2. The longitudinal direction of the body 2 agrees to the inserting direction of the contact metal elements 3.

The body 2 further includes a pair of lead wire retaining portions 2*d* each configured to retain the lead wire 4 inserted into the corresponding lead wire inserting slot 2*c* with the remaining, i.e. non-inserted, portion of the lead wire 4 being bent at an opening end of the slot 2*c* to be parallel with the longitudinal direction toward the rear end of the body 2. Specifically, these lead wire retaining portions 2*d* are provided as two elongate grooves defined in the side face of the body 2 parallel with the longitudinal direction thereof. The width and depth of this groove should be sized appropriately, depending on the thickness of the lead wire 4 to be retained therein.

Incidentally, the two contact element inserting slots 2*b* and the two contact metal elements 3 inserted therein are arranged on the front face 2*a* of the body in symmetry with 180 degrees apart from each other as seen from along the longitudinal direction. Hence, there exists the possibility of erroneous engagement therebetween with reverse 180 degree rotation relative to the mating male connector 11. In order to avoid such problem, in the instant embodiment, a cutout 5 is provided at a portion of the body 2 to be engaged with the male connector 11. In correspondence therewith, the male connector 11 includes, at the corresponding portion thereof, a rib 21 configured to be engaged with the cutout 5. The cutout 5 provides rotational asymmetry at the portion of the body 2 of the female connector 1 to be engaged with the male connector 11, thereby precluding the possibility of such erroneous engagement.

The contact metal element 3 has, on the side of the front face 2*a* of the body 2, U-shaped configuration for receiving and electrically connecting a contact metal element in the form of a projection of the mating male connector 11.

Further, the lead wires 4 are provided as coated wires coated with insulating material such as vinyl so as to be insulated from each other.

Next, the assembly process of the female connector 1 will be described.

As illustrated in FIGS. 3 and 4, first the two lead wires 4 in the entirely coated condition are inserted respectively into the lead wire inserting slots 2*c* and the remaining portions of the lead wires 4 are bent at a right angle toward the rear side of the body 2 and these bent portions are fitted within the lead wire retaining portions 2*d* respectively. Next, as illustrated in FIGS. 4 and 5, the contact elements 3 are inserted into the contact element inserting slots 2*b* respectively. In the course of this inserting operation, as the leading end of each contact element is formed sharp enough to break the vinyl coating of the lead wire 4, when the leading end is pressed against the lead wire 4, the coating is broken open, thus establishing electrical contact between the contact element and the core of the lead wire 4. In this condition, the lead wire 4 is retained by being pinched between the leading end of the contact element 3 and the inner wall of the lead wire inserting slot 2*c*. FIG. 6 illustrates the connector 1 under this completely assembled condition.

Incidentally, the two steps of operation illustrated in FIG. 4, i.e. the bending and retaining steps of the lead wire 4, may be done after the step of inserting the contact element 3 into the contact element inserting slot 2*b*.

Further, the inserting operation of the lead wire 4 into the lead wire inserting slot 2*c* may be effected after removing in advance the coating of the lead wire 4 which is to come into contact with the leading end of the contact element 3.

In the present embodiment, as shown in FIGS. 1 and 2, to the other-side ends of the lead wires 4, there is connected a male connector 6 connectable with a female connector 35 mounted on the printed circuit board 34. Incidentally, the other-side ends of the lead wires 4 may be attached with the further connector in the above manner, or may also be left open to be connected directly on e.g. a printed circuit board by means of soldering or the like.

Figure 7:
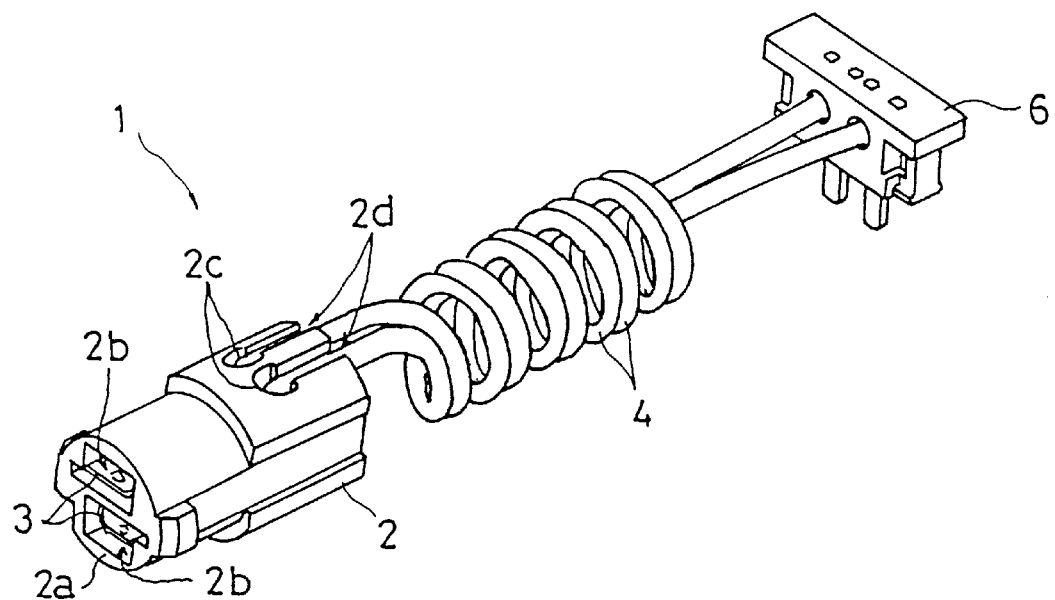
FIG. 7 is a perspective view showing a modified connector also having the first characterizing feature of the present invention.
Figure 8:
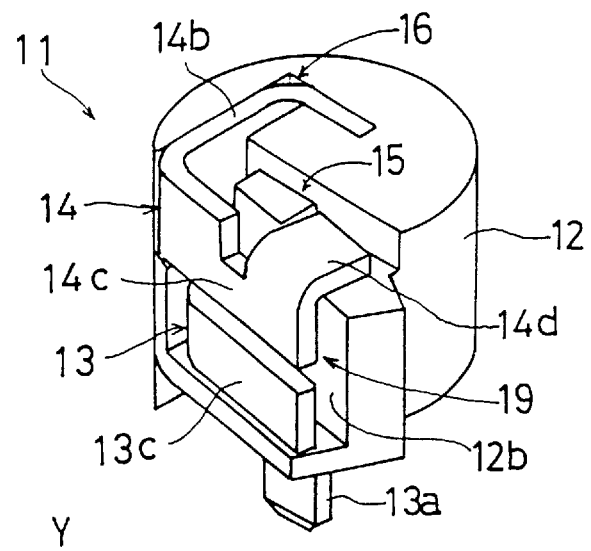
FIG. 8 is a perspective view illustrating a further connector having the second characterizing feature of the present invention.
Figure 9:
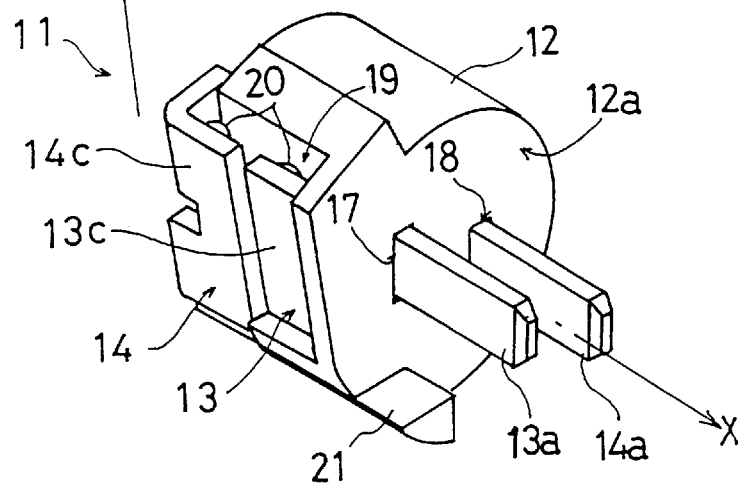
FIG. 9 is a perspective view of the further connector having the second characterizing feature as seen from a direction different from that of FIG. 8.
Figure 10:
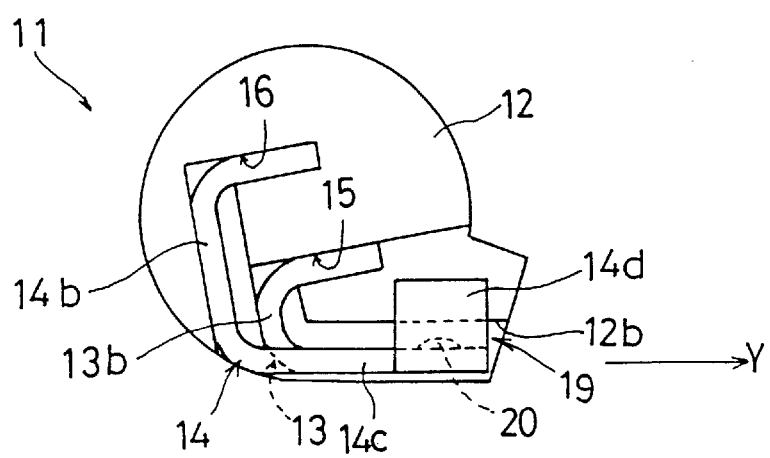
FIG. 10 is a rear view of the connector having the second characterizing feature as seen along a first direction.
Figure 11:
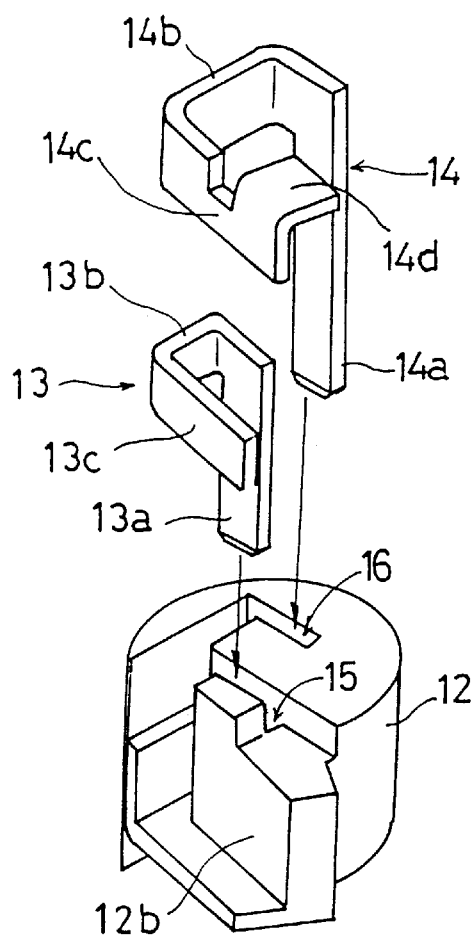
FIG. 11 is an exploded perspective view of the connector having the second characterizing feature.

Further, as shown in FIG. 7, it is also preferred to form the portion of the lead wire 4 extending to the rear side of the body 2 in the form of a curl.

The numbers of the contact metal elements 3 and the lead wires 4 are not limited to those disclosed in the foregoing embodiment. Only one or more than three of them may be employed, respectively.

Also, the contact element 3 need not be U-shaped. The specific shape thereof may vary depending on the need. Further, the shape of the body 2 too may vary appropriately, in correspondence with the shape of the mating connector 11.

Next, embodiments of the male connector 11 will be described in details with reference to FIGS. 8 through 11.

As described hereinbefore, this male connector 11 is to be incorporated within the hinge portion of the compact apparatus 30. For this reason, as shown in FIGS. 8 through 11, the connector 11 includes a substantially cylindrical body 12 made of insulating material and sized to be fitted into a cylindrical inner hollow portion of the hinge portion. This body 12 includes two contact element engaging grooves 15, 16 into which two contact metal elements 13, 14 are to be respectively inserted and engaged and the body 12 includes also through holes 17, 18 through which one-side ends 13*a*, 14*a* of the contact metal elements 13, 14 are introduced to project from a front face 12*a* of the body facing the mating female connector 1 in a first direction X to which the front face 12a is opposed.

The two contact metal elements 13, 14 respectively include the bar-shaped one-side ends 13a, 14a and J-shaped portions 13b, 14b. The other-side ends 13c, 14c remote from the one-side ends 13a, 14a are formed at the leading ends of the J-shaped portions 13a, 14b, respectively and extend along a second direction Y which is normal to the first direction X. The two contact metal elements 13, 14 are introduced one after the other in the mentioned order into the through holes 17, 18 respectively along the first direction X and the sides of the J-shaped portions 13b, 14b adjacent the one-side ends 13a, 14a are engaged into the engaging grooves 15, 16, respectively.

Figure 12:
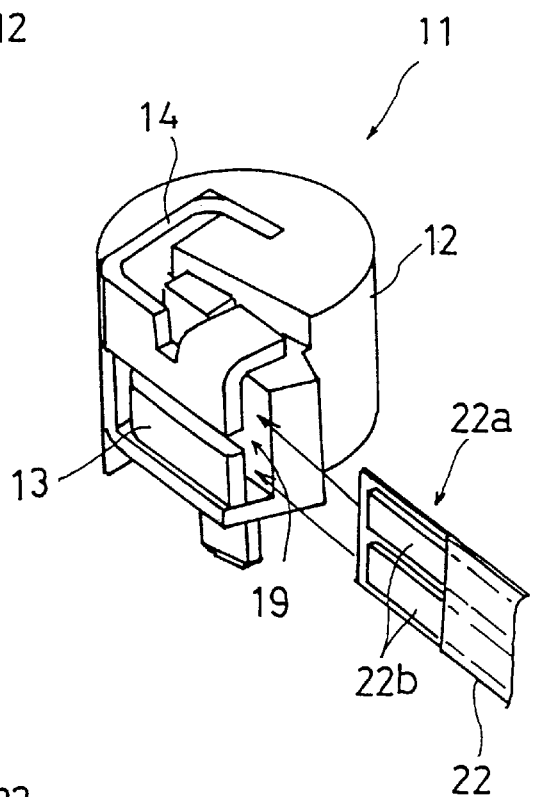
FIG. 12 is a perspective view illustrating a condition in which an FPC is being inserted into the connector having the second characterizing feature.
Figure 13:
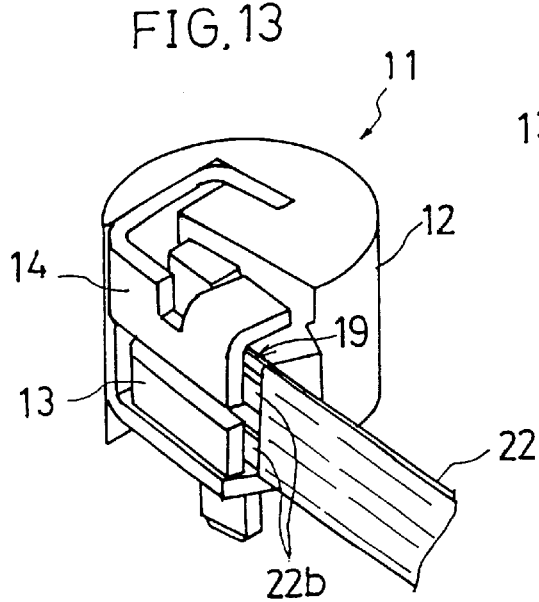
FIG. 13 is a perspective view showing illustrating a further condition in which the FPC has been inserted into the connector having the second characterizing feature.

When the two contact elements 13, 14 are fitted within the body 12, the other-side ends 13c, 14c of these elements 13, 14 are located on a common plane along the first direction and the J-shaped portion 13b of the contact element 13 first inserted is located on the side of the front face 12a of the body 12. Also, the other-side ends 13c, 14c are disposed along and on the outside of an outer peripheral side face 12b of the body 12, with forming a gap 19 having a predetermined distance (about 0.3 mm for example) from the outer peripheral side face 12b. As shown in FIGS. 12 and 13, into this gap 19, an end 22a (see FIG. 14) of an FPC (flexible printed circuit) 22 as a circuit board mounted on the lid 32 is to be press-fitted. For this reason, the other-side ends 13c, 14c are configured as flat plates and also the corresponding portions of the outer peripheral side face 12b which are to be covered with the other-side ends 13c, 14c are formed flat, respectively.

Of the two contact elements 13, 14, a side portion of the other-side end 14c of the element 14, which is inserted after the element 13, on the side remote from the body front face 12a is formed as a bent portion 14d which is bent to project toward the outer peripheral side face 12b. Without such bent portion 14d, the gap 19 would be open not only in the second direction but also in the direction opposite to the first direction X, so that the end 22a of the FPC 22 press-fitted therein can be displaced in said opposite direction. With the presence of the bent portion 14d, the end 22a is retained and positioned against this bent portion 14d, thus restricting such displacement thereof in the direction opposite to the first direction X.

Further, on the inner surfaces of the other-side ends 13c, 14c of the contact elements 13, 14, that is, at the portions thereof facing the outer peripheral side face 12b, there are respectively formed semi-spherical projections 20 having thickness of about 0.1 mm and projecting toward the outer peripheral side face 12b. Accordingly, the distance between each projection 20 and the outer peripheral side face 12b is about 0.2 mm which is shorter than the other portion of the gap 19.

Incidentally, the two through holes 17, 18 and the corresponding ends 13a, 14a projecting respectively therefrom in the first direction X are disposed with rotational symmetric arrangement on the body front face 12a with about 180 degrees apart from each other when seen from the first direction X. So that, there exists the possibility of erroneous engagement with the mating female connector 1 with 180 degree reversed relationship.

In order to avoid such problem, on the front face 12a of the body at an edge thereof, there is provided a rib 21 projecting in the first direction X, so that this rib 21 as an engaging portion may be engaged with the cutout 5 as an engaged portion provided at the corresponding portion of the female connector 1. The presence of this rib 21 negates the 180 degree rotational symmetry on the body front face 12a as seen from the first direction X.

Figure 14:
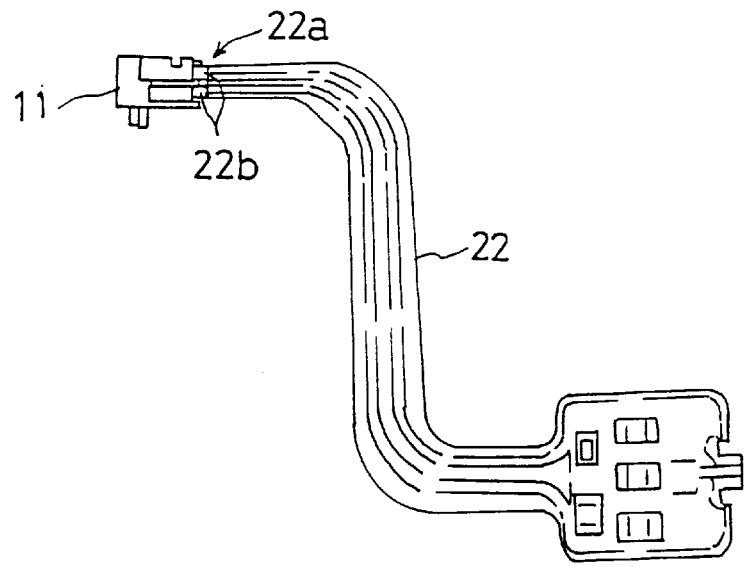
FIG. 14 is a plan view showing an example of the FPC inserted into the connector having the second characterizing feature.
Figure 15:
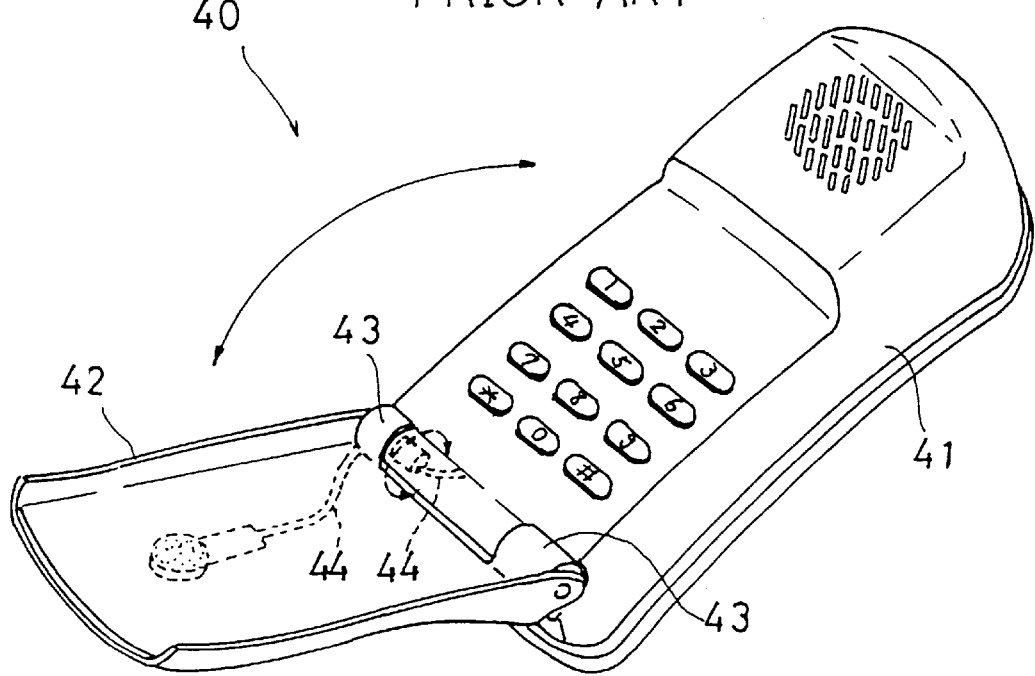
FIG. 15 is a perspective view of a compact apparatus for illustrating the prior art.

As described hereinbefore, the male connector 11 is to be incorporated within the hinge portion, so that the connector may function as a component to establish electric connection between the printed circuit board 34 mounted on the apparatus body 31 and the FPC 22 mounted on the apparatus lid 32. Hence, as shown in FIG. 14, the end 22a of the FPC 22 is press-fitted into the gap 19 from the second direction Y to electrically connect the FPC 22 with the connector 11.

Then, when the end 22a is press-fitted into the gap 19, displacement of the end 22a along the first direction X is restricted by the wall of the body front face 12a and the bent portion 14d. As a result, the positioning between electrodes 22b formed at the end 22a and the other-side ends 13c, 14c may take place with precision. Further, good electric connection may be provided without using soldering between the electrodes 22b and the other-side ends 13c, 14c.

In the above embodiment relating to the male connector 11, the number of the contact metal elements 13, 14 is two. Instead, more than three of them may be employed. Further, the shape of the body 12 may be modified appropriately in accordance with that of the mating connector 1.

Also, the predetermined distance provided by the gap 19 may be changed, depending on the thickness of the end 22a of the FPC 22.

Further, in the foregoing embodiment, the projections 20 are provided at the other-side ends 13c, 14c, respectively. However, such projections are not absolutely needed. Also, the contact between the electrodes 22b formed on the end 22a and the other-side ends 13c, 14c may be provided by soldering, instead of the pressurized contact.

Moreover, in the foregoing embodiment, the bent portion 14d is provided at the other end 14c of the contact element 14 for the purpose of restricting inadvertent displacement of the FPC 22. However, such bent portion 14d is not absolute necessity. Further, instead of forming the bent portion 14d at the other-side end 14c, a projection having a thickness corresponding to the predetermined distance of the gap 19 may be provided at the portion of the outer peripheral side face 12b corresponding to the bent portion 14d, for the same purpose of restricting inadvertent displacement of the FPC 22. In doing so, care should be taken so as not to form this projection too large, since such excessively large projection would provide significant resistance against the insertion of the contact elements 13, 14 into the body 12, thus impairing the efficiency of the assembly operation.

Lastly, the connectors 1, 11 of the invention may be used for any other purpose than incorporating them into the hinge portion of the compact apparatus 30 such as a portable telephone.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A connector comprising:

a body; and a plurality of contact metal elements inserted and fitted in the body;

wherein one-side ends of the contact metal elements project respectively from a front face of the body in a first direction facing the front face and the other-side ends of said contact metal elements extend parallel with each other relative to said first direction and along an outer peripheral side face of the body in a second direction normal to said first direction, with forming a gap of a predetermined distance between all said other-side ends of the contact metal elements and said outer peripheral side face.

2. The connector according to claim 1, wherein the other-side end of each said contact metal element forms, on an inner face thereof, a projection projecting toward said outer peripheral side face.

3. The connector according to claim 1, wherein one of the contact metal elements whose other-side end is located farthest from the front face of the body includes a bent portion formed by bending all or a portion of side portion of the other-side end remote from the front face of the body toward the outer peripheral side face.

4. The connector according to claim 1, wherein the body includes, in a front face thereof, an engaging portion for engagement with an engaged portion of a further connector to be connected with said connector.

5. The connector according to claim 4, wherein said engagement establishes rotational asymmetry between said connector and said further connector relative to a rotational axis extending along a direction in which a plane faces said further connector.

6. A connector adapted to be engaged with a further connector along a first direction, comprising:
   at least one contact metal element;
   a lead wire for being electrically connected with said contact metal element; and
   a body including:
      at least one contact element inserting slot extending along said first direction and facing said further connector, to allow said contact metal element to be inserted into said body along said first direction;
      at least one lead wire inserting slot extending along a second direction angled relative to said first direction, to allow a first portion of said lead wire to be inserted into said body along said second direction, wherein said first portion is pressed from along said first direction and contacted by a leading end of said contact metal element to be electrically connected therewith;
      at least one lead wire retaining groove extending continuously from said lead wire inserting slot along said first direction, to guide and retain, along said first direction and away from said further connector, a second portion of said lead wire extending out of said lead wire inserting slot and being bent into said first direction, wherein said lead wire retaining groove guides, along said first direction and away from said contact metal element and said further connector, a remaining, third portion of said lead wire extending out of said lead wire retaining groove; and
      wherein the body includes, in a face thereof defining said contact element inserting slot, an engaging portion for engagement with an engaged portion of said further connector, the engagement establishing rotational asymmetry between said connector and said further connector relative to a rotational axis extending along said first direction.

7. The connector according to claim 6, wherein the body is a one-piece integral structure.

8. A connector adapted to be engaged with a further connector along a first direction, comprising:
   at least one contact metal element;
   a lead wire for being electrically connected with said contact metal element; and
   a body including:
      at least one contact element inserting slot extending along said first direction and facing said further connector, to allow said contact metal element to be inserted into said body along said first direction;
      at least one lead wire inserting slot extending along a second direction angled relative to said first direction, to allow a first portion of said lead wire to be inserted into said body along said second direction, wherein said first portion is pressed from along said first direction and contacted by a leading end of said contact metal element to be electrically connected therewith;
      at least one lead wire retaining groove extending continuously from said lead wire inserting slot along said first direction, to guide and retain, along said first direction and away from said further connector, a second portion of said lead wire extending out of said lead wire inserting slot and being bent into said first direction, wherein said lead wire retaining groove guides, along said first direction and away from said contact metal element and said further connector, a remaining, third portion of said lead wire extending out of said lead wire retaining groove; and
      wherein the connector, together with said further connector, is used in an apparatus having a hinge unit with a hinge shaft extending longitudinally thereof, and wherein said third portion of the lead wire extends along said hinge shaft.

9. A connector assembly having a first connector, and a second connector adapted to be engaged with said first connector in a first direction, said first connector comprising:
   at least one first contact metal element, and
   a lead wire for being electrically connected with said first contact metal element;
   a first body including:
      at least one first contact element slot extending along said first direction and facing said second connector, to allow said first contact metal element to be inserted into said first body along said first direction;
      at least one lead wire inserting slot extending along a second direction angled relative to said first direction, to allow a first portion of said lead wire to be inserted into said first body along said second direction, wherein said first portion is pressed from along said first direction and contacted by a leading end of said first contact metal element to be electrically connected therewith;
      at least one lead wire retaining groove extending continuously from said lead wire inserting slot along said first direction, to guide and retain, along said first direction and away from said second connector, a second portion of said lead wire extending out of said lead wire inserting slot and being bent into said first direction, wherein said lead wire retaining groove guides, along said first direction and away from said contact metal element and said second connector, a remaining third portion of said lead wire extending out of said lead wire retaining groove; and an engaging portion facing said second connector for engagement therewith;

and said second connector comprising:

at least one second contact metal element electrically connectable with said first contact metal element; and a second body including:

at least one second contact element inserting slot for inserting said second contact metal element; and an engaged portion facing said first connector for engagement with said engaging portion of said first said connector.

10. The connector assembly according to claim 9, wherein one-side end of said second contact metal element projects, in said first direction, from a face of the second body facing said first contact to be electrically connected with said first contact metal element; and wherein the other-side end of said second contact metal element extends in a third direction angled with said first and second directions and along an outer peripheral side face of said second body, with forming a gap of a predetermined distance between said other-side end of said second contact metal element and said outer peripheral side face.

11. The connector assembly according to claim 9, wherein the connector assembly is used in an apparatus having a hinge unit with a hinge shaft extending longitudinally thereof, and wherein said third portion of the lead wire extends along said hinge shaft.

* * * * *

UNITED STATES PATENT AND TRADEMARK OFFICE
CERTIFICATE OF CORRECTION

PATENT NO. : 6,579,117 B2
DATED : June 17, 2003
INVENTOR(S) : Takayuki Nagata

It is certified that error appears in the above-identified patent and that said Letters Patent is hereby corrected as shown below:

Title page,
Item [56], References Cited, FOREIGN PATENT DOCUMENTS, insert:
-- 5939883    3/14/1984    Japan
62180878    11/17/1987    Japan
5949167    3/21/1984    Japan
2125638    3/7/1984    Great Britain --.

Column 2,
Line 9, "According a" should read -- According to a --.

Column 3,
Line 8, "punted" should read -- printed --.

Column 4,
Line 18, "he" should read -- the --.
Line 54, "showing illustrating" should read -- illustrating --.
Line 66, "details" should read -- detail --.

Column 6,
Line 55, "details" should read -- detail --.

Signed and Sealed this

Twenty-third Day of December, 2003

JAMES E. ROGAN
*Director of the United States Patent and Trademark Office*